United States Patent
Heinrich

(10) Patent No.: US 9,030,433 B2
(45) Date of Patent: May 12, 2015

(54) SYSTEM WITH A GESTURE-IDENTIFICATION UNIT

(75) Inventor: Karl-Ludwig Heinrich, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 67 days.

(21) Appl. No.: 13/994,867

(22) PCT Filed: Dec. 6, 2011

(86) PCT No.: PCT/EP2011/071850
§ 371 (c)(1),
(2), (4) Date: Jul. 23, 2013

(87) PCT Pub. No.: WO2012/080029
PCT Pub. Date: Jun. 21, 2012

(65) Prior Publication Data
US 2013/0293504 A1    Nov. 7, 2013

(30) Foreign Application Priority Data
Dec. 17, 2010  (DE) .......................... 10 2010 054 859

(51) Int. Cl.
G06F 3/041     (2006.01)
G06F 3/01      (2006.01)
G06F 3/0488    (2013.01)

(52) U.S. Cl.
CPC ............ *G06F 3/017* (2013.01); *G06F 3/04883* (2013.01); *G06F 2203/04101* (2013.01); *G06F 2203/04808* (2013.01)

(58) Field of Classification Search
None
See application file for complete search history.

(56) References Cited

U.S. PATENT DOCUMENTS

| | | |
|---|---|---|
| 2006/0125803 A1* | 6/2006 | Westerman et al. .......... 345/173 |
| 2006/0267966 A1 | 11/2006 | Grossman et al. |
| 2007/0177803 A1 | 8/2007 | Elias et al. |

FOREIGN PATENT DOCUMENTS

| | | |
|---|---|---|
| WO | 2008/030779 A2 | 3/2008 |
| WO | 2008/116642 A2 | 10/2008 |

OTHER PUBLICATIONS

International Search Report issued in corresponding application No. PCT/EP2011/071850 on Mar. 23, 2012.
English Translation of International Preliminary Report on Patentability issued in corresponding application No. PCT/EP2011/071850.

* cited by examiner

*Primary Examiner* — Jason Olson
(74) *Attorney, Agent, or Firm* — Carter, DeLuca, Farrell & Schmidt, LLP

(57) ABSTRACT

A method is used for operating a system with a touchscreen, a control unit for the touchscreen, a central-processing unit and a gesture-identification unit. In a first method step, a position of one or more physical objects on and/or near the touchscreen is identified by the control unit, and/or a movement of one or more physical objects on and/or near the touchscreen is identified by the control unit. In a further method step, the position and/or the movement of one or more physical objects is associated with a gesture in a gesture set by a first association unit in a gesture-identification unit. Following this, a key combination is transferred by a second association unit to an application, and/or a function of an application is started for the gesture by the second association unit, and/or the gesture is transferred by the second association unit to an application.

34 Claims, 13 Drawing Sheets

 
Figure 4B                Figure 4C
 
Figure 4D                Figure 4E
 
Figure 4F                Figure 4G

 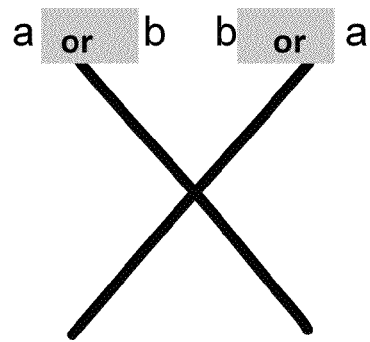
Figure 4H                Figure 4I
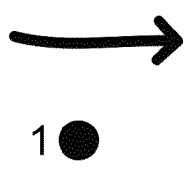 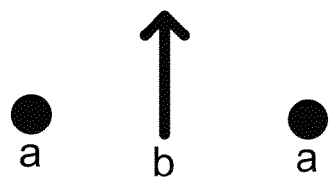
Figure 4J                Figure 5
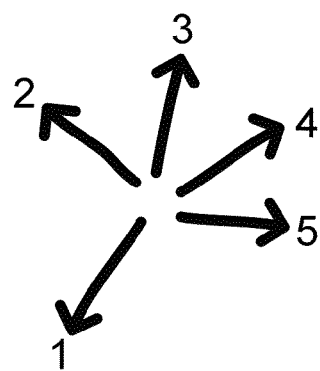 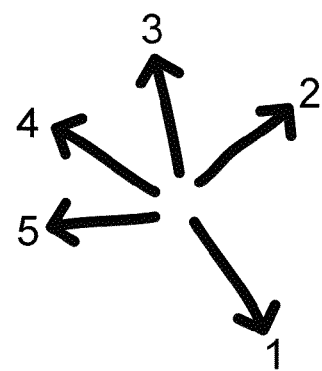
Figure 6A               Figure 6B

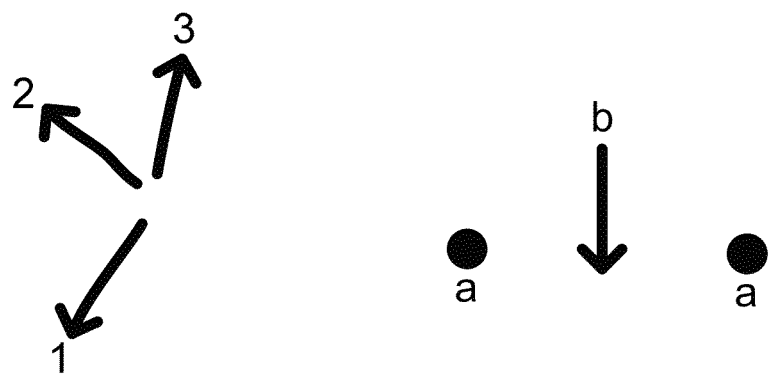
Figure 6C Figure 7
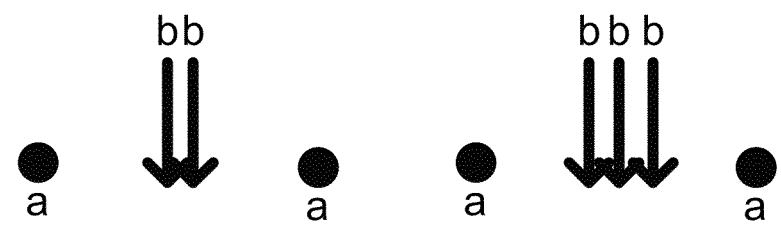
Figure 8 Figure 9
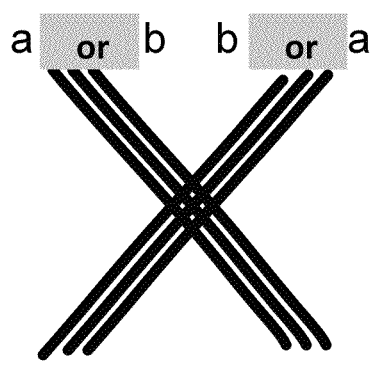 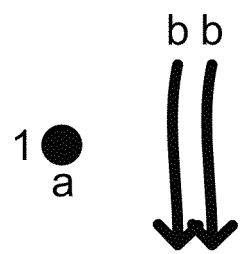
Figure 10A Figure 10B

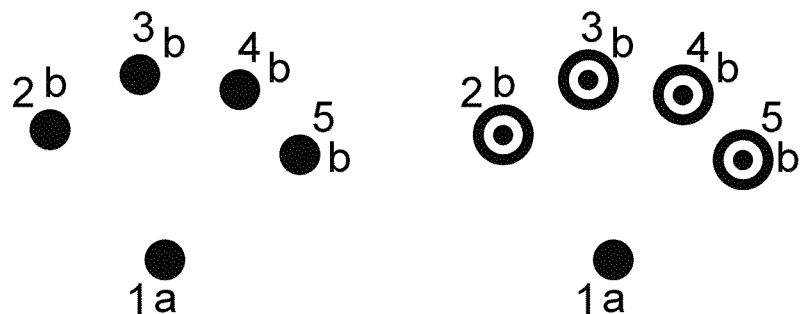
Figure 11A          Figure 11B
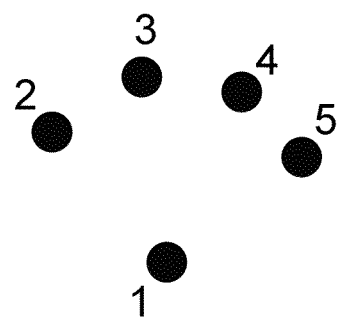      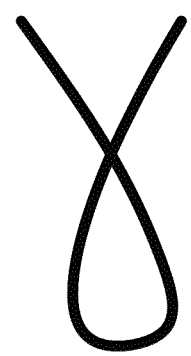
Figure 12           Figure 13
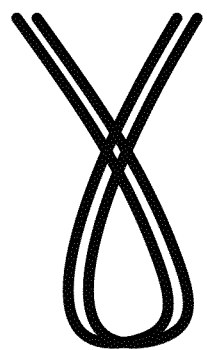      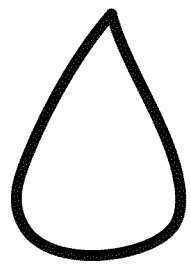
Figure 14           Figure 15

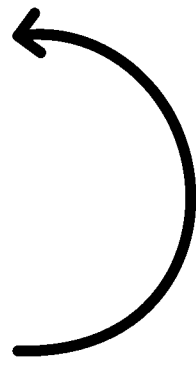
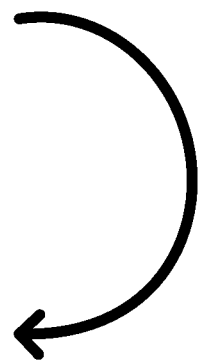
Figure 16　　　　　　　　Figure 17
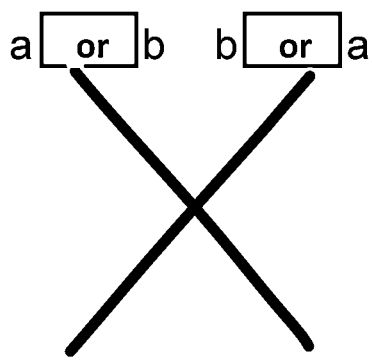
Figure 18A　　　　　　　Figure 18B
Figure 19A　　　　　　　Figure 19B

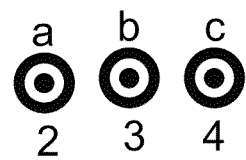
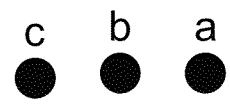
Figure 22C　　　　　　　　Figure 22D
Figure 23A　　　　　　　　Figure 23B
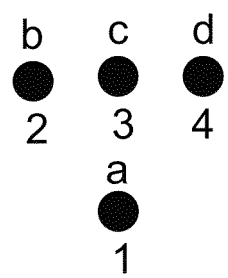
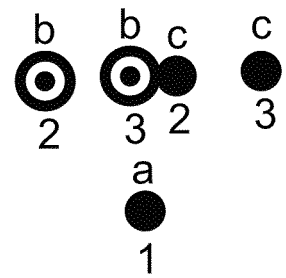
Figure 24　　　　　　　　Figure 25

SYSTEM WITH A GESTURE-IDENTIFICATION UNIT

The invention relates to a system, especially a measuring system, with a touchscreen (English: touchscreen), and a method for operating a system, especially a measuring system, with a touchscreen.

Processing systems, especially measuring systems, achieve significant gains in functionality through every product generation. Accordingly, multi-functional devices which can measure objects under test with different standards have often been created. In line with the increased functionality, the necessary operating software also becomes more extensive. Various keys and rotary knobs are mounted on the device itself in order to avoid heavily nested user menus and to achieve efficient operation by calling the functions directly. However, space on the operating surface is limited and too many keys and rotary knobs and/or keys and rotary knobs arranged too far from the screen significantly impair operational convenience for the user. Accordingly, there have been moves towards the implementation of many user entries with the assistance of a touchscreen.

A portable electronic device, such as a mobile telephone, in which conventional user interfaces, such as pushbuttons, have been replaced by a touch sensitive screen is known from EP 2 059 868 B1. The application to be implemented visualises control buttons which can be activated by the user through the touch sensitive screen. The disadvantage with EP 2 059 868 B1 is that only the elements illustrated can be activated, or that only simple instructions, for example, scrolling the screen, can be transmitted via the touch sensitive screen to the portable electronic device.

The object of the system according to the invention and of the method according to the invention for operating the system is to provide a user interface, which allows even complex instructions to be entered via a touchscreen more intuitively than hitherto or in a simple and consistent manner, so that the menu structure can be streamlined as a result, or that only a minimum number of rotary knobs or keys need to be reserved for the operation of the system.

This object is achieved with regard to the system by the features of claim 33 and with regard to the method for the operation of the system by the features of claim 1. Claim 31 specifies a computer program with program-code means for the implementation of all of the method steps when the program is executed on a computer or a digital-signal processor. Claim 32 specifies a computer-software product with program-code means, especially stored on a machine-readable carrier, for the implementation of all method steps when the program is executed on a computer or a digital-signal processor. Advantageous further developments of the system according to the invention and of the method according to the invention for operating the system with a touchscreen are specified in the respective dependent claims.

The system according to the invention comprises a touchscreen, a control unit for the touch screen, a central-processing unit and a gesture-identification unit. In this context, the control unit identifies the position of one or more physical objects on and/or near the touchscreen. Furthermore or optionally, the control unit identifies a movement of one or more physical objects on and/or near the touchscreen. A first association unit in the gesture-identification unit associates the position and/or the movement of one or more physical objects with a gesture in a gesture set. A second association unit communicates a key combination for the gesture to an application, and/or a second association unit implements a function within an application for the gesture and/or a second association unit transfers the gesture to an application.

It is particularly advantageous that a second association unit transfers a key combination stored for the gesture to an application. This means that functions of the application can be started without the need for a full navigation through different popup menus. Similarly, it is advantageous that a second association unit performs a function corresponding to the gesture in an application. This means that even functions which cannot be performed via a key combination can be started in a very short time without the need to navigate through extensive popup menus. Furthermore, it is advantageous that a second association unit identifies a gesture and transfers the latter to the application. In this context, flexibility is significantly increased, because the application decides for itself which functions should be performed after receiving a given gesture.

The method according to the invention for operating a system with a touchscreen, a control unit for the touchscreen, a central-processing unit and a gesture-identification unit comprises various method steps. In a first method step, a position of one or more physical objects on and/or near the touchscreen is identified by the control unit, and/or a movement of one or more physical objects on and/or near the touchscreen is identified by the control unit. In a further method step, the position and/or the movement of one or more physical objects is associated with a gesture in a gesture set by a first association unit in a gesture-identification unit. Following this, a key combination is transferred by a second association unit to an application, and/or a function for the gesture is started by the second association unit in an application, and/or the gesture is transferred by a second association unit to an application.

One particular advantage of the method for operating a system with a touchscreen is that a key combination for the gesture is transferred to an application, and/or that a function is performed within the application, and/or that the gesture itself is transferred to the application. As a result of the communication of a key combination, older applications which have not been set up for control via a touchscreen can also be conveniently controlled via such a touchscreen. Older, known applications can also be conveniently controlled by implementing a function within an application. In the case of a transfer of the gesture to an application, for example, as an object, corresponding applications can be conveniently controlled, whereas the degree of abstraction is significantly increased.

A further advantage of the system according to the invention is achieved if gestures can be added to the gesture set by the gesture-identification unit, in that the position and/or the movement of one or more physical objects on and/or near the touchscreen is identifiable by the control unit. This means that new gestures can be stored in a simple manner, so that the operating convenience even of older applications can be significantly increased.

Additionally, a further advantage is achieved with the method according to the invention for operating a system with a touchscreen, if the function to be performed by the second association unit is set and can be varied within the application, and/or if the key combination or the sequence of key combinations to be transferred by the second association unit to the application can be set and varied, so that, as a result, the applications can be operated and/or automated more readily. This means that the functionality of available gestures can be matched to the corresponding application. If an application does not provide a function, for example, for rotating an object, the gesture which specifies the rotational movement can be used, for example, in order to switch to and fro between the individual measurement channels.

A further advantage of the method according to the invention for operating a system with a touchscreen is achieved if graphic characters can be entered by a movement of one or more physical objects on the touchscreen and if control characters followed by graphic characters can be entered through a multiploid graphic character. In particular, multiploid graphic characters can be entered very simply using different fingers. As a result, the disadvantage that it has hitherto not been possible to enter control characters and graphic characters in a simple manner is overcome.

A further advantage of the method according to the invention for operating a system with a touchscreen is achieved if Ctrl- characters followed by a graphic character can be entered through a diploid graphic character and/or if an Alt- character followed by a graphic character can be entered through a triploid graphic character and/or if an instruction character (instruction key) followed by a graphic character can be entered through a tetraploid graphic character and/or if a Shift- character followed by a graphic character can be entered through a vertically diploid graphic character and/or if a Ctrl-Alt- character followed by a graphic character can be entered through a stacked triploid character. Especially the frequently required control characters, such as the Ctrl- character and the Alt- character, can be entered in a particularly simple manner simply by drawing the required graphic character with two fingers or respectively with three fingers. Control characters which are needed less frequently can also be entered with minimal difficulty. It is therefore particularly advantageous that various character sequences do not need to be entered with a time interval from one another, but that this can be achieved through a single multiploid graphic character.

Various exemplary embodiments of the invention are described by way of example with reference to the drawings. The same subject matters are shown with the same reference numbers. In detail, the corresponding figures of the drawings show:

FIG. 1 an exemplary embodiment of a measuring system in which the method according to the invention is implemented;

FIG. 2 an exemplary embodiment of a block-circuit diagram of the system according to the invention;

FIG. 3A an exemplary embodiment of a flow chart for the method according to the invention for operating a system with a touchscreen;

FIG. 3B a further exemplary embodiment of a flow chart for the method according to the invention for operating a system with a touchscreen;

FIG. 4A a hand with fingers which is used to explain the notation for the gestures;

FIG. 4B an exemplary embodiment which is used to explain the notation for the gestures;

FIG. 4C a further exemplary embodiment which is used to explain the notation for the gestures;

FIG. 4D a further exemplary embodiment which is used to explain the notation for the gestures;

FIG. 4E a further exemplary embodiment which is used to explain the notation for the gestures;

FIG. 4F a further exemplary embodiment which is used to explain the notation for the gestures;

FIG. 4G a further exemplary embodiment which is used to explain the notation for the gestures;

FIG. 4H a further exemplary embodiment which is used to explain the notation for the gestures;

FIG. 4I a further exemplary embodiment which is used to explain the notation for the gestures;

FIG. 4J a further exemplary embodiment which is used to explain the notation for the gestures;

FIG. 5 an exemplary embodiment of a gesture according to the invention;

FIG. 6A a further exemplary embodiment of a gesture according to the invention;

FIG. 6B a further exemplary embodiment of a gesture according to the invention;

FIG. 6C a further exemplary embodiment of a gesture according to the invention;

FIG. 7 a further exemplary embodiment of a gesture according to the invention;

FIG. 8 a further exemplary embodiment of a gesture according to the invention which contains a diploid movement;

FIG. 9 a further exemplary embodiment of a gesture according to the invention which contains a triploid movement;

FIG. 10A a further exemplary embodiment of a gesture according to the invention which contains two triploid movements;

FIG. 10B a further exemplary embodiment of a gesture according to the invention which contains a diploid movement;

FIG. 11A a further exemplary embodiment of a gesture according to the invention;

FIG. 11B a further exemplary embodiment of a gesture according to the invention which contains a click;

FIG. 12 a further exemplary embodiment of a gesture according to the invention;

FIG. 13 a further exemplary embodiment of a gesture according to the invention;

FIG. 14 a further exemplary embodiment of a gesture according to the invention which contains a diploid movement;

FIG. 15 a further exemplary embodiment of a gesture according to the invention;

FIG. 16 a further exemplary embodiment of a gesture according to the invention;

FIG. 17 a further exemplary embodiment of a gesture according to the invention;

FIG. 18A a further exemplary embodiment of a gesture according to the invention which contains two movements;

FIG. 18B a further exemplary embodiment of a gesture according to the invention which contains a multiple horizontal stroke movement;

FIG. 19A a further exemplary embodiment of a gesture according to the invention;

FIG. 19B a further exemplary embodiment of a gesture according to the invention;

FIG. 20 a further exemplary embodiment of a gesture according to the invention which contains two movements;

FIG. 21A a further exemplary embodiment of a gesture according to the invention which contains two movements;

FIG. 21B a further exemplary embodiment of a gesture according to the invention;

FIG. 21C a further exemplary embodiment of a gesture according to the invention;

FIG. 22A a further exemplary embodiment of a gesture according to the invention;

FIG. 22B a further exemplary embodiment of a gesture according to the invention;

FIG. 22C a further exemplary embodiment of a gesture according to the invention which contains a click;

FIG. 22D a further exemplary embodiment of a gesture according to the invention;

FIG. 23A a further exemplary embodiment of a gesture according to the invention;

FIG. 23B a further exemplary embodiment of a gesture according to the invention which contains a click;

FIG. 24 a further exemplary embodiment of a gesture according to the invention;

FIG. 25 a further exemplary embodiment of a gesture according to the invention;

FIG. 26 a further exemplary embodiment of a gesture according to the invention;

FIG. 27 a further exemplary embodiment of a gesture according to the invention which contains a diploid movement;

FIG. 28A a further exemplary embodiment of a gesture according to the invention which contains two diploid movements;

FIG. 28B a further exemplary embodiment of a gesture according to the invention;

FIG. 29A a further exemplary embodiment of a gesture according to the invention;

FIG. 29B a further exemplary embodiment of a gesture according to the invention;

FIG. 29C a further exemplary embodiment of a gesture according to the invention;

FIG. 30 a further exemplary embodiment of a gesture according to the invention;

FIG. 31A a further exemplary embodiment of a gesture according to the invention;

FIG. 31B a further exemplary embodiment of a gesture according to the invention;

FIG. 32A a further exemplary embodiment of a gesture according to the invention;

FIG. 32B a further exemplary embodiment of a gesture according to the invention which contains a diploid movement;

FIG. 32C a further exemplary embodiment of a gesture according to the invention which contains a triploid movement;

FIG. 32D a further exemplary embodiment of a gesture according to the invention which contains a tetraploid movement;

FIG. 32E a further exemplary embodiment of a gesture according to the invention which contains a vertically diploid movement; and FIG. 32F a further exemplary embodiment of a gesture according to the invention which contains a stacked triploid movement.

FIG. 1 shows an exemplary embodiment of a system 1 according to the invention which is, in particular, a measuring system 1. The measuring system 1 comprises a touchscreen 2 which can have, for example, a resistive and/or capacitive and/or inductive structure, whereas other types of touchscreen 2 can also be used for the measuring system 1. The illustrated measuring system 1 further provides several keys 3 and rotary knobs 4. These can be illuminated, for example, with different colours and are provided, so that the user can implement basic settings of the measuring system 1 as rapidly and directly as possible. Furthermore, the measuring system 1 provides input ports $5_1$, $5_2$ which are used to supply one or more measuring signals of the electronic measuring circuit 12 which is not illustrated. Moreover, the measuring system 1 provides ports for the connection of additional peripherals. These ports can be, for example, USB ports 6 (English: universal serial bus; German: universeller serieller Bus).

Measuring systems 1 which are provided for many different measuring methods generally provide a complex user-menu structure, which comprises many levels and may be heavily nested. To ensure that the user can implement the settings as simply as possible, a plurality of keys 3 and rotary knobs 4 are mounted on the device. Because of the generally predetermined dimensions of such a measuring system, in some cases, only limited space is left at the front of the housing for the display of the measured results. Relatively large touchscreens 2 offer an immense advantage because they allow a higher resolution, so that, for example, several periods of a signal can be displayed. Since the number of keys 3 and rotary knobs 4 can or must be limited, whereas, at the same time, operation must be kept as simple as possible, it should be possible for users to implement various functions directly without the need to operate complex popup menus themselves. In this context, additional keys 3 and rotary knobs 4 can be visualised on the touch screen 2. Such a measuring system 1 is illustrated in FIG. 1. The goal is achieved in that the touchscreen 2 is a touch screen 2 which can register several touches at the same time. Different functions, which were started in previous measuring systems by activating various, separate keys 3 and rotary knobs 4, are invoked, in the measuring system 1 according to the invention, via different gestures.

In this context, gestures are understood to be touches and/or movements of one or more physical objects on and/or near the touchscreen 2. The physical objects are, for example, the fingers $20_1$, $20_2$, $20_3$, $20_4$, $20_5$ of a hand or an input pen. Accordingly, the individual gestures should differ from one another in such a manner that they can be safely identified without the need for the user to "train" the measuring system 1. The gestures should also be consistent with one another and should be defined as a whole in an intuitive manner. For example, a drawn diagonal cross is associated by a user with a current operation being cancelled or a file being deleted. The gestures used in the measuring system 1 should also be capable of being used equally by right-handed and also left-handed users.

FIG. 2 shows an exemplary embodiment of a block-circuit diagram of the system 1 or the measuring system 1 according to the invention. The measuring system 1 provides a touchscreen 2, a control unit 8, a central-processing unit 9 and a gesture-identification unit 10. The central-processing unit can comprise processors and/or FPGAs (English: field programmable gate array; German: Feld-programmierbare Gatter-Anordnung). The touchscreen 2 is connected to the control unit 8 via known interfaces, such as a serial port. The central-processing unit 9 is also connected to the control unit 8 via known interfaces. Moreover, the control unit 8 is connected to the gesture-identification unit 10 via an interface. Furthermore, keys 3 and/or rotary knobs 4, USB ports 6, network ports 11, and an electronic measuring circuit 12 are connected to the control unit 8 via known interfaces. In this context, known interfaces include, for example, USB ports, PCI ports (English: peripheral component interconnect; German: dezentrale Bauteilverbindung), PCIe ports (English: PCI-Express; German: PCI-Express), serial ports, or, in general, interfaces which allow a data transmission.

The control unit 8 identifies a position of one or more physical objects on and/or near the touchscreen 2. This should be understood to mean that the control unit identifies, for example, the position of the individual fingers $20_1$, $20_2$, $20_3$, $20_4$, $20_5$ which are placed onto the touchscreen 2. The control unit 8 also identifies a movement of one or more physical objects on and/or near the touchscreen 2. For example, as a result, the movements of individual fingers $20_1$, $20_2$, $20_3$, $20_4$, $20_5$ moving over the touchscreen 2 can be registered. Dependent upon the type of touchscreen 2, the physical object need not touch the touchscreen 2 directly. It may be sufficient for the physical object to be disposed near the touchscreen 2, whereas, in this case, the distance of the physical object from the touchscreen 2 must not be greater than a few millimeters.

The control unit 8 accordingly registers the individual regions on the touchscreen 2, which are touched by the one or more physical objects or respectively the individual regions on the touchscreen 2 over which the one or more physical objects are moved. The regions can be associated with the corresponding, underlying pixels. The control unit 8 also calculates from this information the position of the pixels touched relative to one another. For example, for a successful activation of a button, which is illustrated on the touchscreen 2, it is necessary for the absolute position of the pixel touched to be registered in order to check which buttons are illustrated on the same region which is touched by the one or more physical objects. Conversely, for the identification of gestures, it is not absolutely important in which region of the touchscreen 2 these are drawn, but, on the contrary, it is important how the individual touches or movements are made relative to one another. This information can be calculated by the control unit 8 or by the central-processing unit 9. The central-processing unit 9 is generally a processor. Following this, the identified position or the identified movement is transmitted by the control unit 8 to the gesture-identification unit 10 where it is evaluated.

For this purpose, the gesture-identification unit 10 provides a first association unit 11 and a second association unit 12. The first association unit 11 receives from the control unit 8 the position and/or the movement of one or more physical objects on and/or near the touchscreen 2. Accordingly, the position and/or the movement with regard to the relevant pixels and also in relationship with one another are transferred to the first association unit 11. The first association unit 11 associates the position and/or the movement of one or more physical objects with a gesture in a gesture set. In this context, a gesture set contains a plurality of gestures. It is particularly advantageous if the individual gestures of a gesture set are clearly differentiated from one another, so that even gestures drawn by inexperienced users can be associated unambiguously with a gesture stored in a gesture set. A gesture itself can comprise a plurality of sub-gestures, whereas the sub-gestures are drawn with the same or different physical objects, or respectively, whereas the individual sub-gestures can be drawn with a time interval relative to one another. A sub-gesture is generally drawn by the movement of precisely one physical object.

As soon as the first association unit 11 has identified a gesture, it communicates the latter to the second association unit 12, which is also embodied in the gesture-identification unit 10. The second association unit 12 transfers a key combination or a sequence of key combinations stored for the identified gesture to an application $14_1$, $14_2$, $14_3$. Moreover, the second association unit 12 can also perform a given function within an application $14_1$, $14_2$, $14_3$ dependent upon the identified gesture. The second association unit 12 can also transfer the identified gesture to the application $14_1$, $14_2$, $14_3$.

If a given key combination or a sequence of key combinations is stored for every gesture in a gesture set, older applications $14_1$, $14_2$, $14_3$ which are embodied by the measuring system 1 according to the invention, can be used significantly more readily by a user. Moreover, this means that such applications can be automated, by transferring a given sequence of key combinations to the latter. The key combinations can be, for example, the Ctrl-key (German: Steuerungs-Taste, or Control-key) and the S-key, which are otherwise depressed simultaneously in order to save a given content. For this purpose, the second association unit 12 contains a table, in which the individual gestures are stored, and in which a key combination or a sequence of key combinations is stored for every gesture.

The application $14_1$, $14_2$, $14_3$ to which the corresponding key combination or the sequence of key combinations should be transferred for an identified gesture is also stored in the table, which is not illustrated. In the case of a sequence of key combinations, the individual key combinations are transferred to the corresponding application $14_1$, $14_2$, $14_3$ in succession, so that, specifically with older applications $14_1$, $14_2$, $14_3$, the troublesome navigation through complex popup menus can be considerably simplified. The time duration between the transfer of the individual key combinations can be freely adjusted in this context. In addition to key combinations, clicks at given positions of the touchscreen 2 can also be stored in the table. For example, this allows the fully automatic acknowledgement of dialogue boxes thereby reducing measuring times. On the basis of this control according to the invention by means of gestures, all applications can be automated to a high degree via the touchscreen 2.

Furthermore, it is particularly advantageous that the second association unit 12 performs or starts a given function within an application $14_1$, $14_2$, $14_3$ as soon as a given gesture is identified. With applications $14_1$, $14_2$, $14_3$ of which the function calls are known convenience of operation can therefore be increased in a particularly simple manner. For every gesture in the gesture set, function calls, which are implemented upon the identification of the corresponding gesture by the second association unit 12, are specified in a table, which is not illustrated. Further parameters, which are transferred to the corresponding functions when called, can also be stored in the table itself. The various options for how the identification of gestures can be responded to, ensure that older applications $14_1$, $14_2$, $14_3$ can still be implemented without limitation of their functionality through the absence of keys 3 or rotary knobs 4 in the new measuring system 1 according to the invention.

Finally, it is particularly advantageous if the second association unit 12 transfers the identified gesture directly to an application $14_1$, $14_2$, $14_3$. In this case, the identified gesture can be further processed directly within the application $14_1$, $14_2$, $14_3$ thereby further increasing abstraction. This is relevant especially in the case of newly developed applications $14_1$, $14_2$, $14_3$. Accordingly, for the identified gesture, an object can be generated which possesses attributes in which, for example, the identified graphic character or the name of the gesture is stored, and a reference regarding whether this graphic character has been drawn in a multiploid manner, or the probability that the graphic character has been correctly identified, or the time duration within which the graphic character was drawn and so on. Such an object with a plurality of attributes can then be transferred to a function within the corresponding application $14_1$, $14_2$, $14_3$, which further processes the latter. It is also possible that an enumeration (English: enumeration; abbreviated: enum) is defined for all gestures, and that only the corresponding enumeration value for the identified gesture is transferred to the application $14_1$, $14_2$, $14_3$.

The second association unit 12 can also control different applications $14_1$, $14_2$, $14_3$ dependent upon the gesture identified. If a first gesture is identified, a stored key combination or a sequence of key combinations can be transferred to a first application $14_1$, $14_2$, $14_3$, whereas, if a second gesture is identified, in the case of a different application $14_1$, $14_2$, $14_3$, a function is implemented directly within the latter by the second association unit 12, and whereas, if a first gesture is identified, this is transferred to a further application $14_1$, $14_2$, $14_3$ by the second association unit 12. In two or more applications $14_1$, $14_2$, $14_3$, it is also possible for a key combination or a sequence of key combinations stored for every gesture to be transferred to the applications $14_1$, $14_2$, $14_3$. The same also applies for the calling of functions within an application $14_1$, $14_2$, $14_3$ by the second association unit 12 or for the transfer of the corresponding gesture to the respective applications $14_1$, $14_2$, $14_3$ by the second association unit 12.

The measuring system 1 according to the invention further comprises a storage unit 13. This storage unit 13 can be, for example, a main memory and/or a hard-disk memory. The storage unit 13 is connected to the central-processing unit 9. Accordingly, the central-processing unit 9 manages the storage unit 13. Different parts of the storage unit 13 are used by different applications $14_1$, $14_2$, $14_3$ which are implemented together by the central-processing unit 9. The applications $14_1$, $14_2$, $14_3$ can be, for example, the operating system $14_1$ for the measuring system 1 according to the invention and/or the applications software $14_2$, also referred to as measurement software $14_2$ for the measuring system 1 according to the invention and/or the evaluation software $14_3$ for the measuring system 1 according to the invention. The gesture-identification unit 10 is also connected to the storage unit 13, so that the second association unit 12 within the gesture-identification unit 10 can access the applications $14_1$, $14_2$, $14_3$ stored in the storage unit 13 in the manner described above. The applications $14_1$, $14_2$, $14_3$ described merely represent applications $14_1$, $14_2$, $14_3$ selected by way of example. Alongside these applications $14_1$, $14_2$, $14_3$, further applications not illustrated in the exemplary embodiment from FIG. 2 can also be implemented.

It is also possible for further gestures to be added to the gesture set in the gesture-identification unit 10, in that the position and/or the movement of one or more physical objects on and/or near the touchscreen 2 is identified by the control unit 8. For example, using one or more input pens or fingers $20_1$, $20_2$, $20_3$, $20_4$, $20_5$, a user can draw a gesture comprising touches and/or movements on the touch screen 2, whereas this is stored in the first association unit 11. It is then possible to determine which actions should be started upon identification of this gesture. As already described, the actions can be key combinations or a sequence of key combinations, which are transmitted to an application $14_1$, $14_2$, $14_3$ and/or it is possible to determine which function should be performed by the second association unit 12 within an application $14_1$, $14_2$, $14_3$ and/or it is possible to determine that the new gesture should be transmitted by the second association unit 12 to an application $14_1$, $14_2$, $14_3$.

FIG. 3A shows an exemplary embodiment of the method according to the invention for operating a system 1 with a touchscreen 2. The method for operating a system 1, especially a measuring system 1 with a touchscreen 2, a control unit 8 for the touchscreen 2, a central-processing unit 9 and a gesture-identification unit 10 provides several method steps. Like the gesture-identification unit 10 and the touchscreen 2, the central-processing unit 9 is connected to the control unit 8 via known interfaces.

In a first method step $S_1$, a position of one or more physical objects on and/or near the touchscreen 2 is identified by the control unit 8 and/or a movement of one or more physical objects on and/or near the touchscreen 2 is identified by the control unit 8. The term "position" is used broadly for a touch of the screen unit 2 by one or more physical objects. The term "movement" should be understood in the sense that one or more physical objects on and/or near the touchscreen 2 are moved over the latter, in other words, it relates to a moving touch. A clicking or pressing on the touchscreen 2 can also be included under the term "touch".

In a second method step $S_2$, the position and/or movement on and/or near the touchscreen 2 originating from one or more physical objects, as identified by the control unit 8, is associated with a gesture in a gesture set by the first association unit 11 in the gesture-identification unit 10. Furthermore, a key combination or a sequence of key combinations for the corresponding gesture is transferred by the second association unit 12 to an application $14_1$, $14_2$, $14_3$, and/or a function for the corresponding gesture within an application $14_1$, $14_2$, $14_3$ is started by the second association unit 12, and/or the corresponding gesture is transferred by a second association unit 12 to the application $14_1$, $14_2$, $14_3$. In this context, the gesture identified by the first association unit 11 is transferred to the second association unit 12. In addition to a key combination or a sequence of key combinations, clicks at a given position on the touch screen 2 can also be transferred to the corresponding application $14_1$, $14_2$, $14_3$.

Optionally, as shown in FIG. 3B, method step $S_3$ can be implemented after method step $S_1$ or method step $S_2$. In method step $S_3$ according to the invention, gestures can be added to the gesture set by the gesture-identification unit 10, in that the position and/or the movement of one or more physical objects on and/or near the touchscreen 2 is identified by the control unit 8. A user can draw a gesture, which comprises the touches and/or movements of one or more input pens or fingers $20_1$, $20_2$, $20_3$, $20_4$, $20_5$ on the touchscreen 2 and associate this gesture with a given functionality. This functionality can be, especially, key combinations or a sequence of key combinations, which are transferred by the second association unit 12 to the application $14_1$, $14_2$, $14_3$, or a function, which is started by the second association unit 12 within an application $14_1$, $14_2$, $14_3$, or the possibility that the gesture as a whole is transferred by the second association unit 12 to an application $14_1$, $14_2$, $14_3$.

In the following drawings, the functionality of various gestures in a gesture set is described in greater detail. FIGS. 4A to 4J are used to explain the notation of the gestures according to the invention, which are explained in greater detail in FIGS. 5 to 32F. In principle, the gestures can be drawn with any of the fingers $20_1$, $20_2$, $20_3$, $20_4$, $20_5$ and also with other objects, for example, an input pen. In the following section, it is assumed by way of simplification that the gestures are always drawn with the fingers $20_1$, $20_2$, $20_3$, $20_4$, $20_5$. Gestures which are drawn simultaneously with two fingers $20_1$, $20_2$, $20_3$, $20_4$, $20_5$ are referred to as "diploid". By analogy, there are also "triploid" gestures with three fingers, "tetraploid" gestures with four fingers and "pentaploid" gestures with five fingers. Reference is also made here to multiploid gestures. Unless otherwise indicated the ploidy is horizontal. Accordingly, the tips of the fingers are disposed approximately horizontally side-by-side.

The following drawings contain idealised gestures. In their realisation, tolerances with regard to positions, dimensions, angles, relationships and velocities must also be taken into consideration. With regard to freedom from restrictions, consideration has been given, with all of the gestures according to the invention, to the requirement that they can be drawn with the left-hand and also with the right-hand. For reasons of globalisation, attention has also been paid, in all of the gestures according to the invention, to the requirement that these are as internationally intelligible as possible. Many gestures which relate to specific regions of the user surface or to specific elements displayed on the latter can also have a so-called "hotspot" (German: Neisser Punkt), that is to say, a defined point which specifies the position at which the gesture should act. This circumstance will be explained again with specific reference to the corresponding gesture. Reference to a "basic posture" indicates the natural posture of the hand when placed onto a flat surface with minimal tension. All of the fingers $20_1$, $20_2$, $20_3$, $20_4$, $20_5$ are slightly curved and slightly spread apart from one another.

FIG. 4A shows a left-hand with several physical objects in the form of fingers $20_1$, $20_2$, $20_3$, $20_4$, $20_5$. It is evident that circled numbers have been associated with the fingers $20_1$, $20_2$, $20_3$, $20_4$, $20_5$. The thumb $20_1$ has the number one, the index finger $20_2$ the number two, the middle finger $20_3$ the number three, the ring finger $20_4$ the number four and the little finger $20_5$ the number five. The numbers 1 to 5 can also be implemented in the gestures according to the invention, which represent non-binding suggestions regarding which fingers $20_1$, $20_2$, $20_3$, $20_4$, $20_5$ should best be used to draw the corresponding sub-gestures. The numbers which are associated with FIGS. 4A to 32F have nothing to do with the reference numbers from FIGS. 1 to 3B.

Figure 4A:
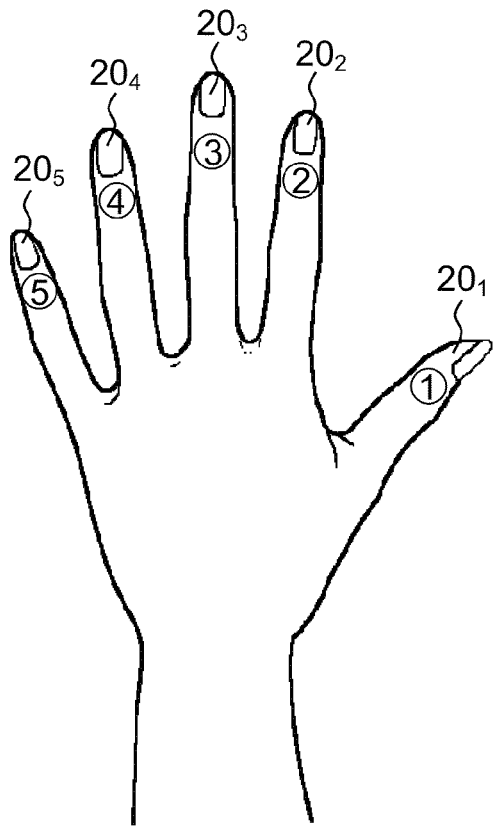
FIG. 4B shows an example of a horizontal stroke gesture. In this context, a line is drawn towards the right in the direction of the arrow.
FIG. 4C shows a horizontal stroke gesture, whereas the direction in which the line is drawn is not relevant.

FIG. 4D shows a gesture, which symbolises that the touchscreen 2 is "pressed". This can be achieved by a finger $20_1$, $20_2$, $20_3$, $20_4$, $20_5$ which remains in place on the touch screen 2 and does not move. In this case, the control unit 8 identifies the position of the finger $20_1$, $20_2$, $20_3$, $20_4$, $20_5$ and communicates this to the first association unit 11 in the gesture-identification unit 10.

FIG. 4E shows a gesture which indicates that a position of the touchscreen 2 has been "clicked", "tapped", that is, touched by a finger $20_1$, $20_2$, $20_3$, $20_4$, $20_5$, whereas the finger $20_1$, $20_2$, $20_3$, $20_4$, $20_5$ is removed again after a very short time. The click time is preferably less than 100 ms. However, the click time can also be adjusted.

FIG. 4F shows a gesture in which the starting point of a line is clicked, whereas the line is then continued horizontally towards the right.

FIG. 4G shows a gesture which contains various movements which are performed with a time interval relative to one another. In this context, the sub-gesture marked with "a" is implemented first, and the sub-gesture marked with "b" is performed next. Sub-gestures without letters or with the same letters should accordingly be drawn at the same time. This is the case, for example, with multiploid figures, which are drawn by placing two fingertips in a synchronous movement relative to one another. In this context, a sub-gesture need not necessarily be finished before the next sub-gesture begins. Especially in the case of pressing, a finger $20_1$, $20_2$, $20_3$, $20_4$, $20_5$ can remain in place, when the next sub-gesture is drawn. If a gesture contains such follow-on markings, or if sub-gestures do not provide a follow-on marking, these must in fact be drawn at the same time, but can be drawn at any time during the drawing of the gesture. Accordingly, a gesture can comprise one or more sub-gestures which are drawn with different fingers $20_1$, $20_2$, $20_3$, $20_4$, $20_5$ and/or in a time sequence.

FIG. 4H shows a gesture which comprises a diploid line, which is drawn vertically downwards or vertically upwards.

FIG. 4I shows a gesture which comprises two sub-gestures which should be drawn one after the other, whereas the sequence in which the sub-gestures should be drawn is irrelevant. This is indicated by the marking "a or b", or "b or a" with the respective sub-gestures.

FIG. 4J shows a gesture which comprises two sub-gestures which should be drawn simultaneously, whereas one gesture should preferably be drawn by the thumb $20_1$.

Figure 1:
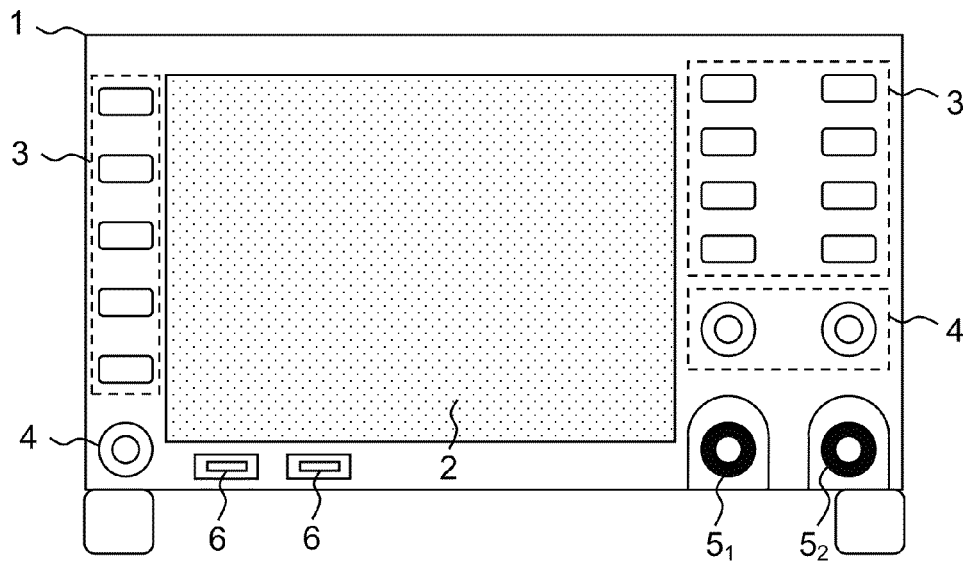

The following FIGS. 5 to 32F contain some exemplary embodiments of the gesture set according to the invention, which comprises a plurality of gestures. To ensure a clear overview, reference numbers will not be shown, especially as the individual drawings are arranged in a logical manner. All of the gestures can be drawn on the touchscreen 2 which is illustrated in FIG. 1.

FIG. 5 shows a gesture which is defined in that two fingers $20_1$, $20_2$, $20_3$, $20_4$, $20_5$ which are arranged approximately horizontally side-by-side, touch the touchscreen 2, and that a line is drawn approximately vertically upwards between the two fingers $20_1$, $20_2$, $20_3$, $20_4$, $20_5$. This gesture could symbolise, for example, a rising sun or a sprouting shoot and can be used to generate a "new file" and/or a "new object", when the second association unit 12 communicates with the corresponding application $14_1$, $14_2$, $14_3$.

FIG. 6A shows a further gesture which is defined in that three or four or five fingers $20_1$, $20_2$, $20_3$, $20_4$, $20_5$ are arranged together and touch the touch screen 2 and then move apart from one another in a spreading manner. FIG. 6A shows a gesture which can be performed by a right-hand. The gesture can be used, for example, to generate the instruction to "open", for example, a file and, through the second association unit 12, to transmit it to the application $14_1$, $14_2$, $14_3$. FIG. 6B shows a further gesture according to the invention which is also defined in that three or four or five fingers are arranged together and touch the touchscreen 2 and then move apart from one another in a spreading manner. This gesture corresponds to the gesture from FIG. 6A, whereas the gesture from FIG. 6B is drawn by a left-hand. FIG. 6C shows the same gesture as also shown in FIG. 6A, with the exception that, instead of five fingers $20_1$, $20_2$, $20_3$, $20_4$, $20_5$, only three fingers $20_1$, $20_2$, $20_3$, $20_4$, $20_5$ are used to draw the gesture.

FIG. 7 shows a further exemplary embodiment of a gesture according to the invention which is defined in that two fingers $20_1$, $20_2$, $20_3$, $20_4$, $20_5$ which are arranged approximately horizontally relative to one another touch the touchscreen 2, and that a line is drawn approximately vertically downwards between the two fingers $20_1$, $20_2$, $20_3$, $20_4$, $20_5$. This gesture can be used, for example, to generate an instruction to "save", which is transmitted by the second association unit 12 to the corresponding application $14_1$, $14_2$, $14_3$. In this context, the fingers $20_1$, $20_2$, $20_3$, $20_4$, $20_5$ disposed with a horizontal spacing are initially arranged side-by-side, and the vertical line is drawn downwards only in a second step, as is indicated by the letters "a" and "b".

FIG. 8 shows a further exemplary embodiment of a gesture according to the invention, which is defined in that two fingers $20_1$, $20_2$, $20_3$, $20_4$, $20_5$ which are arranged approximately horizontally side-by-side touch the touchscreen 2 and that a diploid line is then drawn approximately vertically downwards between the two fingers $20_1$, $20_2$, $20_3$, $20_4$, $20_5$. This gesture is similar to the gesture from FIG. 7, so that the gesture from FIG. 8 can be used, for example, to generate an instruction to "save as", which is transmitted by the second association unit 12 to the corresponding application $14_1$, $14_2$, $14_3$.

FIG. 9 shows a further exemplary embodiment of a gesture according to the invention which is defined in that two fingers $20_1$, $20_2$, $20_3$, $20_4$, $20_5$ which are arranged approximately horizontally side-by-side touch the touchscreen 2, and that a triploid line is then drawn vertically downwards between the two fingers $20_1$, $20_2$, $20_3$, $20_4$, $20_5$. This gesture is also similar to the gestures from FIG. 7 and FIG. 8, so that it can be used, for example, to generate an instruction to "save all" and to transmit the latter through the second association unit 12 to the corresponding application 14₁, 14₂, 14₃.

FIG. 10A shows a further exemplary embodiment of a gesture according to the invention which is defined in that a triploid diagonal cross is drawn on the touchscreen 2. FIG. 10B shows a further exemplary embodiment of a gesture according to the invention which is defined in that the touchscreen 2 is pressed with one finger $20_1$, $20_2$, $20_3$, $20_4$, $20_5$, especially the thumb $20_1$, and a diploid line is then drawn approximately vertically downwards with two fingers $20_1$, $20_2$, $20_3$, $20_4$, $20_5$ at an approximately horizontal spacing from this. If the gesture is drawn with the left-hand, the diploid line can also be drawn approximately vertically downwards on the left, alongside the position pressed by the finger $20_1$, $20_2$, $20_3$, $20_4$, $20_5$. However, this fact is not illustrated in FIG. 10B. In addition to a diploid line, a triploid line can also be drawn vertically downwards. The gestures from FIGS. 10A and 10B can be used, for example, so that the corresponding application $14_1$, $14_2$, $14_3$ performs the instruction "exit".

FIG. 11A shows a further exemplary embodiment of a gesture according to the invention which is defined in that a finger $20_1$, $20_2$, $20_3$, $20_4$, $20_5$, especially the thumb $20_1$, is placed onto the touchscreen 2 and, at a time interval from this, two further or three further or four further fingers $20_1$, $20_2$, $20_3$, $20_4$, $20_5$ are placed onto the touchscreen 2 in a basic posture. The further fingers $20_1$, $20_2$, $20_3$, $20_4$, $20_5$ are preferably placed onto the touchscreen 2 at the same time. FIG. 11B shows a further exemplary embodiment of a gesture according to the invention which is defined in that a finger $20_1$, $20_2$, $20_3$, $20_4$, $20_5$, especially the thumb $20_1$, is placed on the touchscreen 2 and, at a time interval from this, two further or three further or four further fingers $20_1$, $20_2$, $20_3$, $20_4$, $20_5$ click the touchscreen 2 in a basic posture. The further fingers $20_1$, $20_2$, $20_3$, $20_4$, $20_5$ preferably click on the touchscreen 2 at the same time. The gestures from FIG. 11A and FIG. 11B can be used to generate an instruction for a "print preview", which is transmitted via the second association unit 12 to the corresponding application $14_1$, $14_2$, $14_3$.

FIG. 12 shows a further exemplary embodiment of a gesture according to the invention which is defined in that a finger $20_1$, $20_2$, $20_3$, $20_4$, $20_5$, especially the thumb $20_1$, and two further or three further or four further fingers $20_1$, $20_2$, $20_3$, $20_4$, $20_5$ are placed on the touchscreen 2 in a basic posture. This gesture is used, for example, to generate an instruction to "print", which is transmitted by the second association unit 12 to the corresponding application $14_1$, $14_2$, $14_3$. In this context, the fingers $20_1$, $20_2$, $20_3$, $20_4$, $20_5$ are placed for a fixed time, for example, for a maximum of one second. This gesture can be drawn with the right-hand and also with the left-hand.

FIG. 13 shows a further exemplary embodiment of a gesture according to the invention which is defined in that a loop closed at the bottom which has its crossing point clearly below it ends is drawn on the touchscreen 2. This gesture is used, for example, to generate the instruction "cut", so that the latter is transmitted by the second association unit 12 to the corresponding application $14_1$, $14_2$, $14_3$. Such a loop closed at the bottom can also be associated with a stylised pair of scissors.

FIG. 14 shows a further exemplary embodiment of a gesture according to the invention which is characterised in that a diploid loop closed at the bottom which has its crossing point clearly below its ends is drawn on the touchscreen 2. This gesture can be used, for example, to generate the instruction "copy" which is transmitted by means of the second association unit 12 to the corresponding application $14_1$, $14_2$, $14_3$. Before this, the object to be copied must be selected or respectively marked.

FIG. 15 shows a further exemplary embodiment of a gesture according to the invention which is defined in that an approximately droplet-shaped structure is drawn on the touchscreen 2. This gesture can be used, for example, to transmit the instruction "insert" through the second association unit 12 to the corresponding application $14_1$, $14_2$, $14_3$. The tip of the droplet-shaped structure represents a so-called "hotspot". The object to be inserted is inserted at the position at which the tip is disposed. The droplet shaped structure can symbolise, for example, the dropping of the buffer.

FIG. 16 shows a further exemplary embodiment of a gesture according to the invention which is defined in that a curved arrow is drawn on the touchscreen 2 from the bottom upwards pointing to the right. This gesture can be used, for example, to generate the instruction "undo", which is transmitted by the second association unit 12 to the corresponding application $14_1$, $14_2$, $14_3$. The gesture can accordingly symbolise that the time on a clock should be wound back.

FIG. 17 shows a further exemplary embodiment of a gesture according to the invention which is defined in that a curved arrow is drawn on the touchscreen 2 from the top downwards pointing to the right. The gesture can be used to generate the instruction "restore" which is transmitted by the second association unit 12 to the corresponding application $14_1$, $14_2$, $14_3$. By contrast with the gesture from FIG. 16, the gesture from FIG. 17 can accordingly symbolise that the time should be moved forward.

FIG. 18A shows a further exemplary embodiment of a gesture according to the invention which is defined in that a diagonal cross is drawn on the touch screen 2. FIG. 18B shows a further exemplary embodiment of a gesture according to the invention which is defined in that an approximately horizontal line is drawn several times on the touchscreen 2. The horizontal line in this context is drawn to and fro at least once, preferably one and a half times. The gesture from FIG. 18B and also the gesture from FIG. 18A can be used to generate the instruction "delete" which is transmitted by the second association unit 12 to the corresponding application $14_1$, $14_2$, $14_3$.

FIG. 19A shows a further exemplary embodiment of a gesture according to the invention which is defined in that a wavy line is drawn on the touch screen 2. FIG. 19B shows a further exemplary embodiment of a gesture according to the invention which is defined in that a period of a sine wave is drawn on the touchscreen 2. This gesture is similar to the gesture from FIG. 19A and both can be used to generate the instruction "process" which is transmitted by the second association unit 12 to the corresponding application $14_1$, $14_4$, $14_3$.

Figure 20:
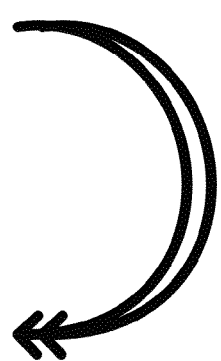

FIG. 20 shows a further exemplary embodiment of a gesture according to the invention which is defined in that a diploid curved arrow is drawn on the touchscreen 2 from the top downwards pointing to the right. The gesture can be used, for example, to generate the instruction "update" which is transmitted by the second association unit 12 to the corresponding application $14_1$, $14_2$, $14_3$.

Figure 21A:
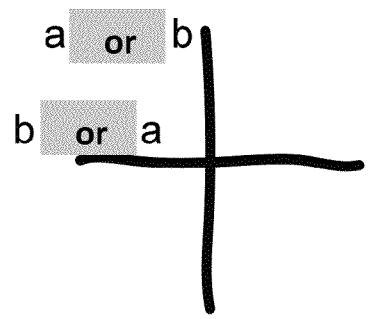
Figure 21B:
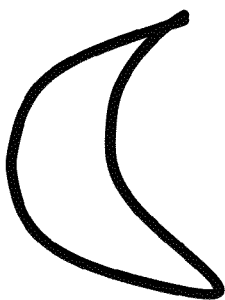
Figure 21C:
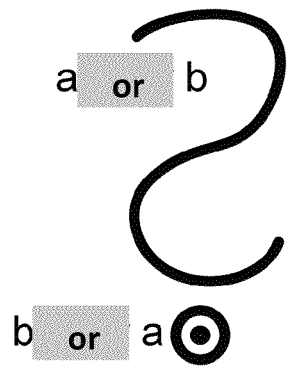

FIG. 21A shows a further exemplary embodiment of a gesture according to the invention which is defined in that a cross is drawn on the touch screen 2. In this context, the time sequence in which the horizontal and the vertical line are drawn on the touchscreen 2 is not significant. The horizontal or transverse line and the vertical or perpendicular line intercept approximately in the middle. FIG. 21B shows a further exemplary embodiment of a gesture according to the invention which is defined in that a half moon is drawn on the touchscreen 2. FIG. 21C shows a further exemplary embodiment of a gesture according to the invention which is defined in that a question mark is drawn on the touchscreen 2, whereas the time sequence of the full stop or the reflected "S" is not significant. The gestures from FIGS. 21A, 21B and 21C can be used to generate an instruction "help" which is transmitted by the second association unit 12 to the corresponding application $14_1$, $14_2$, $14_3$.

Figure 22A:
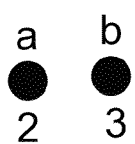
Figure 22B:
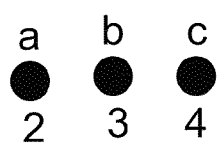

FIG. 22A shows an exemplary embodiment of a gesture according to the invention which is defined in that two fingers $20_1$, $20_2$, $20_3$, $20_4$, $20_5$ are placed in succession onto the touchscreen 2 with an approximately horizontal spacing from one another. FIG. 22B shows a further exemplary embodiment of a gesture according to the invention which is defined in that three fingers $20_1$, $20_2$, $20_3$, $20_4$, $20_5$ are placed in succession onto the touchscreen 2 with an approximately horizontal spacing from one another. FIG. 22C shows an exemplary embodiment with a gesture according to the invention which is defined in that three fingers $20_1$, $20_2$, $20_3$, $20_4$, $20_5$ are placed in succession onto the touchscreen 2 with an approximately horizontal spacing from one another and click the latter. FIG. 22D shows an exemplary embodiment which contains a gesture according to the invention which is defined in that three fingers $20_1$, $20_2$, $20_3$, $20_4$, $20_5$ are placed onto the touchscreen 2 with an approximately horizontal spacing from one another in the opposite sequence to the gesture from FIG. 22B. Altogether, the gesture can also be performed with five fingers $20_1$, $20_2$, $20_3$, $20_4$, $20_5$ which touch or click the touchscreen 2 in succession. The gestures from FIGS. 22A, 22B, 22C and 22D can be used, for example, to generate the instruction "find", which the second association unit 12 transmits to the corresponding application $14_1$, $14_2$, $14_3$.

FIG. 23A shows a further exemplary embodiment of a gesture according to the invention which is defined in that two fingers $20_1$, $20_2$, $20_3$, $20_4$, $20_5$ with an approximately horizontal spacing click the touchscreen 2 and that, following this, two fingers $20_1$, $20_2$, $20_3$, $20_4$, $20_5$ offset horizontally from the latter with an approximately horizontal spacing then touch the touchscreen 2. FIG. 23B shows a further exemplary embodiment with a gesture according to the invention which is defined that two fingers $20_1$, $20_2$, $20_3$, $20_4$, $20_5$ with an approximately horizontal spacing click the touchscreen 2, and following this, two fingers $20_1$, $20_2$, $20_3$, $20_4$, $20_5$ offset from the latter with an approximately horizontal spacing then click the touchscreen 2. The gesture can also be performed with five fingers $20_1$, $20_2$, $20_3$, $20_4$, $20_5$ which click the touchscreen 2 and then, offset from the latter, touch or click the touchscreen 2. The gesture from FIG. 23A and also the gesture from FIG. 23B can be used to generate the instruction "find next" which is transmitted by the second association unit 12 to the corresponding application $14_1$, $14_2$, $14_3$.

FIG. 24 shows an exemplary embodiment with a gesture according to the invention which is defined in that a first finger $20_1$, $20_2$, $20_3$, $20_4$, $20_5$, especially a thumb $20_1$ touches the touchscreen 2, and three fingers $20_1$, $20_2$, $20_3$, $20_4$, $20_5$ are then placed onto the touchscreen 2 in succession with an approximately horizontal spacing from one another above the first finger $20_1$, $20_2$, $20_3$, $20_4$, $20_5$. The three fingers $20_1$, $20_2$, $20_3$, $20_4$, $20_5$ with a horizontal spacing from one another are preferably arranged with a spacing above the first finger $20_1$, $20_2$, $20_3$, $20_4$, $20_5$. The gesture can also be performed with five fingers $20_1$, $20_2$, $20_3$, $20_4$, $20_5$. This gesture can be used, for example, to generate the instruction "replace", which is transmitted by the second association unit 12 to the corresponding application $14_1$, $14_2$, $14_3$.

FIG. 25 shows a further exemplary embodiment of a gesture according to the invention which is defined in that a first finger $20_1$, $20_2$, $20_3$, $20_4$, $20_5$, especially a thumb $20_1$, touches the touchscreen 2, and two fingers $20_1$, $20_2$, $20_3$, $20_4$, $20_5$ with an approximately horizontal spacing then click the touchscreen 2 above the first finger $20_1$, $20_2$, $20_3$, $20_4$, $20_5$, and that two fingers $20_1$, $20_2$, $20_3$, $20_4$, $20_5$ with a horizontal spacing then touch the touchscreen 2 with a horizontal offset to the right from the latter above the first finger $20_1$, $20_2$, $20_3$, $20_4$, $20_5$. By preference, the touchscreen 2 is touched first with the thumb $20_1$ and then clicked with the index finger $20_2$ and the middle finger $20_3$ above the thumb $20_1$, before the index finger $20_2$ and the middle finger $20_3$ are placed onto the touchscreen 2 with a horizontal spacing from the latter. This gesture can be used, for example, to generate the instruction "replace and find next", which is then transmitted by the second association unit 12 to the corresponding application $14_1$, $14_2$, $14_3$.

Figure 26:
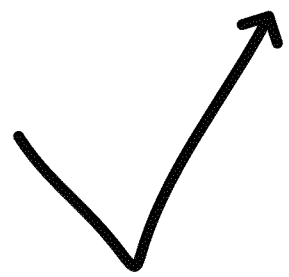

FIG. 26 shows a further exemplary embodiment which contains a gesture according to the invention which is defined in that a tick is drawn on the touchscreen 2 from left to right. This gesture can be used, for example, to generate the instruction "OK", which is transmitted by a second association unit 12 to the corresponding application $14_1$, $14_2$, $14_3$. The instruction "OK" can be used, for example, to acknowledge dialogue boxes.

Figure 27:
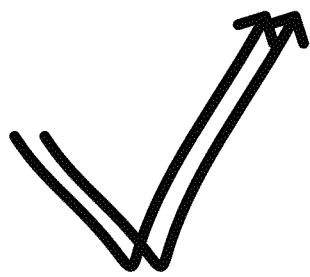

FIG. 27 shows a further exemplary embodiment with a gesture according to the invention which is defined in that a diploid tick is drawn on the touchscreen 2 from left to right. Such a gesture can be used, for example, to generate the instruction "accept", which is transmitted by the second association unit 12 to the corresponding application $14_1$, $14_2$, $14_3$.

Figure 28A:
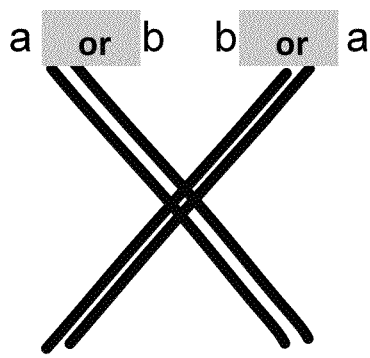
Figure 28B:
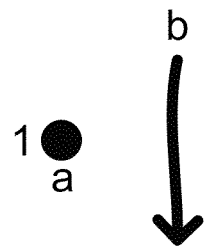

FIG. 28A shows a further exemplary embodiment of a gesture according to the invention which is defined in that a diploid diagonal cross is drawn on the touch screen 2. FIG. 28B shows a further exemplary embodiment of a gesture according to the invention which is defined in that the touchscreen 2 is pressed with one finger $20_1$, $20_2$, $20_3$, $20_4$, $20_5$, and then, with an approximately horizontal spacing from this, an approximately vertical line is drawn downwards with one finger $20_1$, $20_2$, $20_3$, $20_4$, $20_5$. The gestures from FIGS. 28A and 28B can be used, for example, to generate the instruction "cancel", which is transmitted by the association unit 12 to the corresponding applications $14_1$, $14_2$, $14_3$.

Figure 29A:
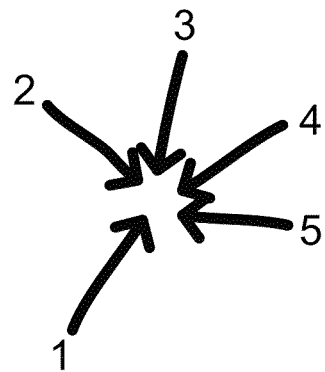
Figure 29B:
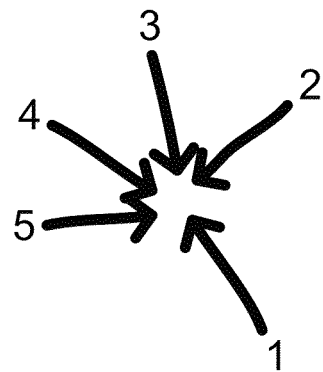
Figures 29C, 30:
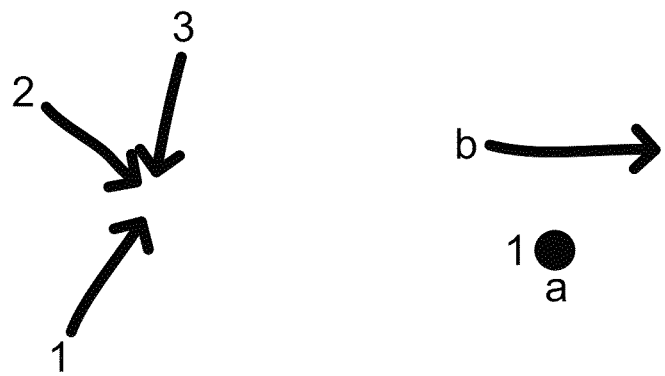

FIG. 29A shows a further exemplary embodiment of a gesture according to the invention which is defined in that five fingers $20_1$, $20_2$, $20_3$, $20_4$, $20_5$ which are arranged apart from one another and touch the touchscreen 2 are subsequently moved together. FIG. 29B shows the same gesture as FIG. 29A with the exception that the gesture from FIG. 29B is drawn with the left hand. FIG. 29C shows a further exemplary embodiment of a gesture according to the invention which is defined in that three fingers $20_1$, $20_2$, $20_3$, $20_4$, $20_5$ are arranged apart from one another and touch the touchscreen 2 and are then moved together. Four fingers $20_1$, $20_2$, $20_3$, $20_4$, $20_5$ which are initially arranged apart and touch the touchscreen 2 and are then moved together can also be used. The gestures from FIGS. 29A, 29B and 29C can be used to generate an instruction "close" which is transmitted by the second association unit 12 to the corresponding application $14_1$, $14_2$, $14_3$.

FIG. 30 shows a further exemplary embodiment of a gesture according to the invention which is defined in that one finger $20_1$, $20_2$, $20_3$, $20_4$, $20_5$ is placed on the touchscreen 2 and then an approximately horizontal line is drawn above it from left to right. The horizontal line can also be drawn from right to left, and the horizontal line can also be drawn below the point which is first touched by the finger $20_1$, $20_2$, $20_3$, $20_4$, $20_5$. This gesture generates, for example, the instruction "settings/options" which is transmitted by the second association unit 12 to the corresponding application $14_1$, $14_2$, $14_3$.

Figures 31A, 31B:
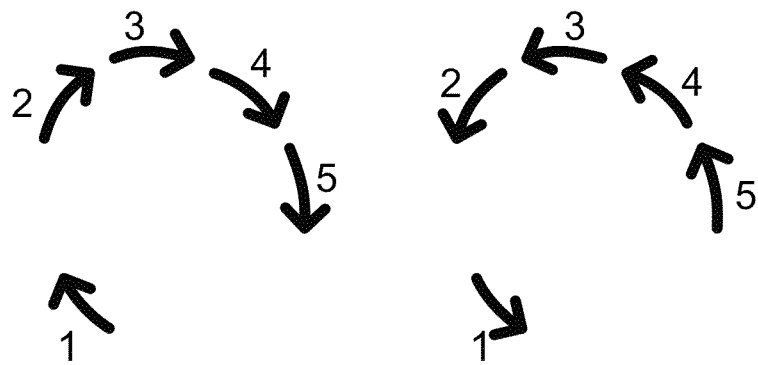

FIG. 31A shows a further exemplary embodiment of a gesture which is defined in that two to five fingers $20_1$, $20_2$, $20_3$, $20_4$, $20_5$ are arranged apart from one another and touch the touchscreen 2 and perform a rotational movement in a clockwise direction. FIG. 31B shows a further exemplary embodiment of a gesture according to the invention which is defined in that two or three or four or five fingers $20_1$, $20_2$, $20_3$, $20_4$, $20_5$ are arranged apart from one another and touch the touchscreen 2 and perform a rotational movement in an anti-clockwise direction. The gestures from FIG. 31A and FIG. 31B can be used to generate an instruction "rotate" which is transmitted by the association unit 12 to the corresponding application $14_1$, $14_2$, $14_3$. However, although it is not illustrated in the exemplary embodiment from FIGS. 31A and 31B, it is also entirely possible that the rotational movement can be performed only with two or three or four fingers $20_1$, $20_2$, $20_3$, $20_4$, $20_5$.

By contrast, graphic characters can be entered by drawing the graphic character with a finger $20_1$, $20_2$, $20_3$, $20_4$, $20_5$ or a corresponding input pen. In this context, the distinction can reliably be made between capital letters and small letters. It has hitherto only been possible to enter control characters, for example, the Alt- character, via a touchscreen 2 in a very awkward manner. Within the context of the invention, it is possible for control characters followed by graphic characters to be entered very readily. This is achieved by entering a multiploid graphic character.

Figures 32A, 32B:

FIG. 32A shows an exemplary embodiment for the entry of the capital letter "M". In this context the direction of movement is irrelevant.

FIG. 32B shows an exemplary embodiment of a gesture according to the invention by means of which a control character followed by graphic character can be entered. The diploid graphic character "M" is illustrated. A gesture which contains a diploid graphic character can be further processed to the effect that a Ctrl- character (control key, or Ctrl-key) followed by the graphic character is transmitted to the second association unit 12. If a diploid graphic character with the letter "S" is drawn, data which has not yet been saved can be saved in a particularly simple manner.

Figure 32C:
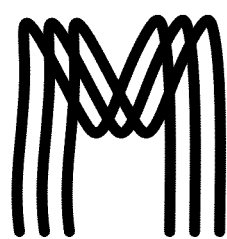

FIG. 32C shows an exemplary embodiment of a gesture according to the invention. The gesture according to the invention contains a triploid graphic character. A triploid graphic character can be interpreted, for example, to the effect that an Alt- character followed by the corresponding graphic character is transmitted to the second association unit.

Figure 32D:
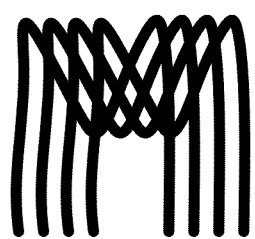

FIG. 32D shows a further exemplary embodiment of a gesture according to the invention. The gesture according to the invention contains a tetraploid graphic character. If a tetraploid graphic character is identified, the instruction character (instruction key), for example, in the form of the Windows key (German: Fenster-Taste), or respectively Apple-command key (German: Apple-Befehls-Taste), followed by a corresponding graphic character is transmitted to the second association unit 12, which reroutes the corresponding entry to the corresponding application $14_1$, $14_2$, $14_3$.

Figure 32E:
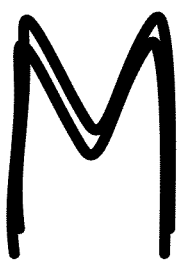

FIG. 32E shows a further exemplary embodiment of a gesture according to the invention. The gesture according to the invention contains a vertically diploid graphic character. In the exemplary embodiment, two letters "M" are shown vertically one above the other. Such a vertically diploid graphic character can be entered, for example, when two fingers $20_1$, $20_2$, $20_3$, $20_4$, $20_5$ trace the contours of the corresponding graphic character one above the other. Such a vertically diploid graphic character can be used, for example, to transfer a Shift- character (Shift key) followed by a graphic character through the second association unit 12 to the corresponding application $14_1$, $14_2$, $14_3$.

Figure 32F:
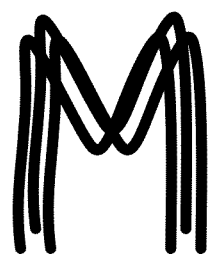

FIG. 32F shows a further exemplary embodiment of a gesture according to the invention. The gesture according to the invention comprises a stacked triploid graphic character. A stacked triploid graphic character of this kind can be drawn when three fingers $20_1$, $20_2$, $20_3$, $20_4$, $20_5$ arranged with a horizontal spacing from one another are placed onto the touchscreen 2, whereas one finger $20_1$, $20_2$, $20_3$, $20_4$, $20_5$ is arranged in the middle above the other two fingers $20_1$, $20_2$, $20_3$, $20_4$, $20_5$, and whereas all three fingers $20_1$, $20_2$, $20_3$, $20_4$, $20_5$ trace the corresponding graphic character. In this context, the three fingers $20_1$, $20_2$, $20_3$, $20_4$, $20_5$ are arranged in a triangle relative to one another. Such a gesture can be used, for example, to transfer a Ctrl- character and in succession an Alt- character (Alt-key) followed by the corresponding graphic character via the second association unit 12 to the corresponding application $14_1$, $14_2$, $14_3$.

The method according to the invention for operating a system 1, especially a measuring system 1 with a touchscreen 2 is particularly suitable for implementation in a program which is executed on a computer or a digital signal processor. The method for operating a system 1, especially a measuring system 1 with a touchscreen 2 is also particularly suitable for storage, especially on a machine-readable carrier as program code, so that the program can subsequently be executed on a computer or a digital signal processor.

Instead of a measuring system 1, the system 1 can also be another computer system, which is implemented, for example, in a portable telephone and/or electronic personal organiser. In general, the system 1 can be a system in which at least one central data-processing unit (CPU) is embodied.

The system 1 according to the invention, especially the measuring system 1, can also contain a control unit 8, which is connected to a camera or a stereoscopic camera, whereas the gesture-identification unit can identify gestures in the images taken, or whereas the gesture-identification unit can identify and evaluate three-dimensional gestures in the stereoscopic images taken. This means that the user can control the measuring system 1 with various gestures even at a spatial distance from the latter.

Within the scope of the invention, all of the features described and/or illustrated can be combined with one another as required. In particular, the dependent claims relating to the method can also be combined with the device claims relating to the system 1 and vice versa.

KEY TO DRAWINGS

Figure 2:
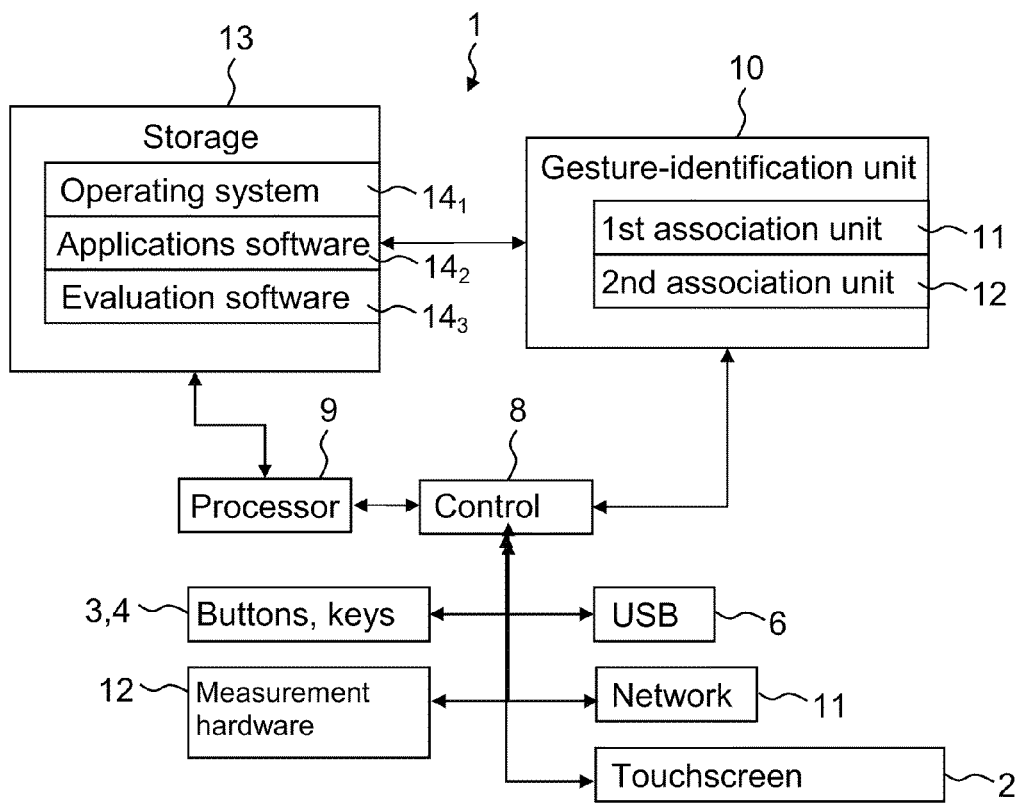
Figure 3A:
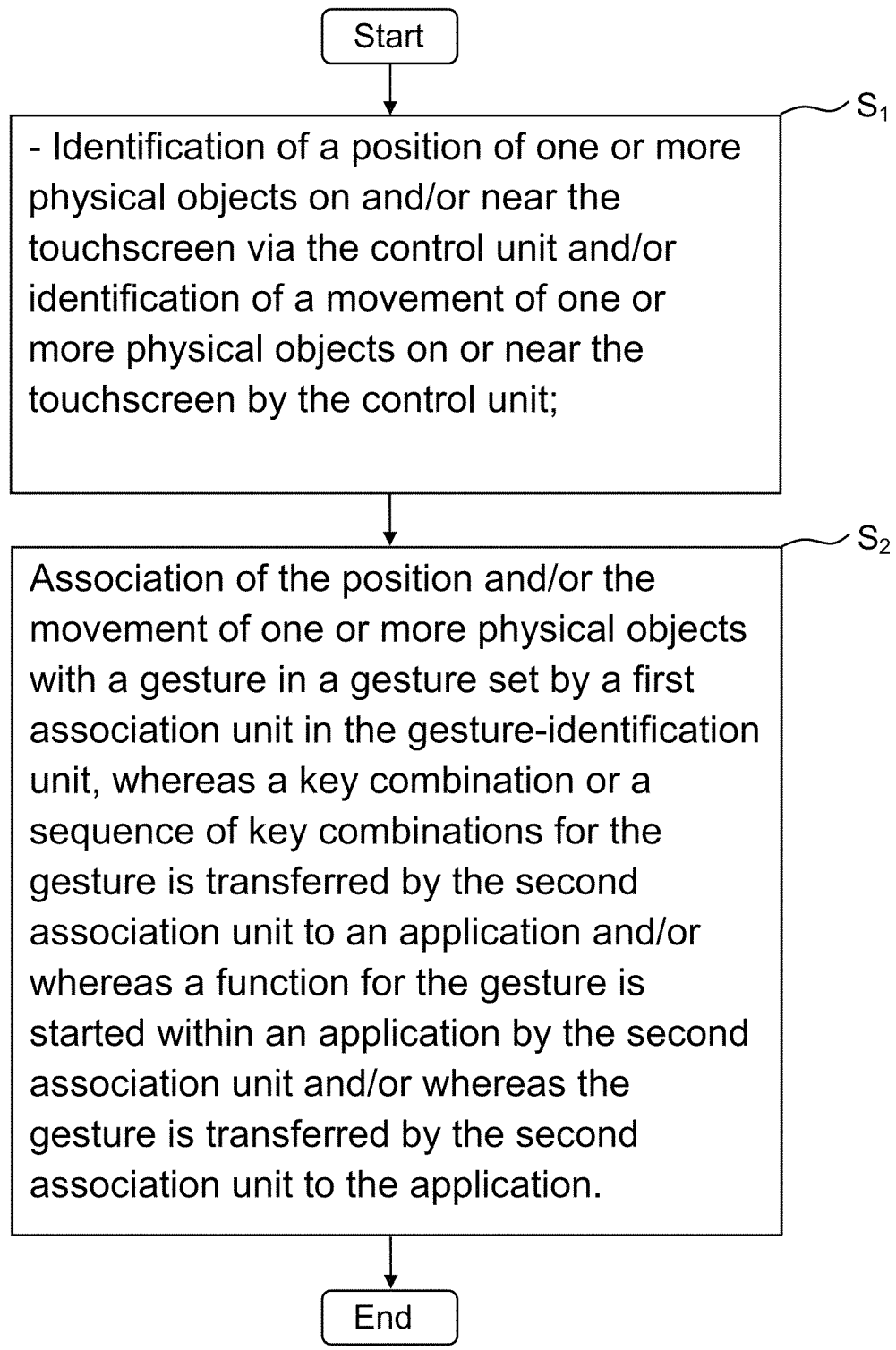
Figure 3B:
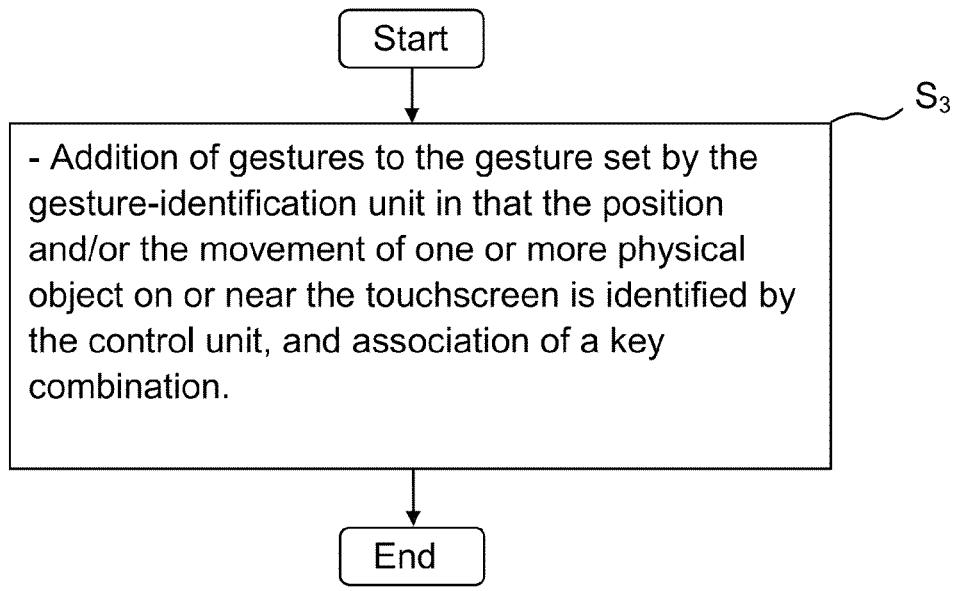

FIGS. 1 and 2

| | |
|---|---|
| Speicher | Storage |
| Betriebssystem | Operating system |
| Anwendungssoftware | Applications software |
| Auswertesoftware | Evaluation software |
| Gestenerkennungseinheit | Gesture-identification unit |
| 1. Zuordnungseinheit | First association unit |
| 2. Zuordnungseinheit | Second association unit |
| Prozessor | Processor |
| Steuerung | Control |
| Knöpfe, Taster | Buttons, keys |

-continued

| | |
|---|---|
| Messhardware | Measurement hardware |
| Netzwerk | Network |
| Berührungsbildschirm | Touchscreen |

FIG. 3A

| | |
|---|---|
| | Start |
| S1 | Identification of a position of one or more physical objects on and/or near the touchscreen via the control unit and/or identification of a movement of one or more physical objects on or near the touchscreen by the control unit; |
| S2 | Association of the position and/or the movement of one or more physical objects with a gesture in a gesture set by a first association unit in the gesture-identification unit, whereas a key combination or a sequence of key combinations for the gesture is transferred by the second association unit to an application and/or whereas a function for the gesture is started within an application by the second association unit and/or whereas the gesture is transferred by the second association unit to the application. |
| | End |

FIG. 3B

| | |
|---|---|
| | Start |
| S3 | Addition of gestures to the gesture set by the gesture-identification unit in that the position and/or the movement of one or more physical objects on or near the touchscreen is identified by the control unit, and association of a key combination |
| | End |

FIGS. 4 to 32F

| | |
|---|---|
| a oder b | a or b |
| b oder a | a or a |

The invention claimed is:

1. A method for operating a system with a touchscreen, a control unit for the touchscreen, a central-processing unit, and a gesture-identification unit, the method comprising:
identifying a position or a movement of one or more physical objects on or near the touchscreen by the control unit; and
associating the position or the movement of one or more physical objects with a gesture in a gesture set by a first association unit in the gesture-identification unit,
wherein a key combination or a sequence of key combinations for the gesture is transferred by a second association unit to an application, or a function for the gesture is started by the second association unit within an application, or the gesture is transferred by a second association unit to the application,
wherein graphic characters are entered through a movement of one or more physical objects on the touch screen, and
wherein control characters followed by the graphic characters are entered through multiploid graphic characters.

2. The method according to claim 1, further comprising:
adding gestures to the gesture set by the gesture-identification unit in that the position or the movement of one or more physical objects on or near the touchscreen is identified by the control unit.

3. The method according to claim 1, wherein the function to be implemented by the second association unit is set within the application and can be varied, or
wherein the key combination to be transferred or the sequence of key combinations to be transferred by the second association unit to the application can be set and varied, so that the applications can be operated more simply or automated as a result.

4. The method according to claim 1, wherein a first control character can be entered through a diploid graphic character, or
wherein a second control character can be entered through a triploid graphic character, or
wherein a third control character can be entered through a tetraploid graphic character, or
wherein a fourth control character can be entered through a vertically diploid graphic character, or
wherein a fifth control character can be entered through a stacked triploid character.

5. The method according to claim 1, wherein the one or more physical objects are one or more human fingers or input pens.

6. The method according to claim 5, wherein a gesture is defined in that two fingers which are arranged approximately horizontally side-by-side touch the touchscreen and that a line is drawn approximately vertically upwards between the two fingers, so that an instruction to generate a "new file" or a "new object" is transmitted to the application.

7. The method according to claim 5, wherein a further gesture is defined in that at least three fingers are arranged together and touch the touchscreen and then move apart in a spreading manner, so that an instruction to "open" a file is generated and transmitted to the application.

8. The method according to claim 5, wherein a further gesture is defined in that a triploid diagonal cross is drawn on the touchscreen or that the touchscreen is pressed with one finger and an approximately diploid or triploid line is then drawn downwards at an approximately horizontal distance from this with at least two fingers, so that an instruction to "exit" is generated and transmitted to the application.

9. The method according to claim 5, wherein a further gesture is defined in that two fingers which are arranged approximately horizontally side-by-side touch the touchscreen and that a line is drawn approximately vertically downwards between the two fingers, so that an instruction to "save" is generated and transmitted to the application.

10. The method according to claim 5, wherein a further gesture is defined in that two fingers which are arranged approximately horizontally side-by-side touch the touchscreen and that a diploid line is then drawn approximately vertically downwards between the two fingers, so that an instruction to "save as" is generated and transmitted to the application.

11. The method according to claim 5, wherein a further gesture is defined in that two fingers which are arranged approximately horizontally side-by-side touch the touchscreen and that a triploid line is then drawn approximately vertically downwards between the two fingers, so that an instruction to "save all" is generated and transmitted to the application.

12. The method according to claim 5, wherein a further gesture is defined in that a finger and at least two other fingers are placed in a basic position on the touchscreen, so that an instruction to "print" is generated and transmitted to the application.

13. The method according to claim 5, wherein a further gesture is defined in that a finger is placed on the touchscreen and, at a time interval from this, at least two other fingers are placed in a basic position on the touchscreen and click the latter, so that an instruction "print preview" is generated and transmitted to the application.

14. The method according to claim 5, wherein a further gesture is defined in that a finger is placed on the touchscreen and an approximately horizontal line is then drawn above it or below it, so that an instruction "settings/options" is generated and transmitted to the application.

15. The method according to claim 5, wherein a further gesture is defined in that at least one finger is placed on the touchscreen or clicks the touchscreen in succession with an approximately horizontal spacing from one another so that an instruction "find" is generated and transmitted to the application.

16. The method according to claim 5, wherein a further gesture is defined in that two fingers with an approximately horizontal spacing from one another click the touchscreen, and that two fingers arranged horizontally offset relative to the latter with an approximately horizontal spacing then click or touch the touchscreen, so that an instruction "find next" is generated and transmitted to the application.

17. The method according to claim 5, wherein a further gesture is defined in that a finger touches the touchscreen and three fingers are then placed on the touchscreen in succession with an approximately horizontal spacing from one another above the finger, so that an instruction "replace" is generated and transmitted to the application.

18. The method according to claim 5, wherein a further gesture is defined in that a finger touches the touchscreen and two fingers with an approximately horizontal spacing then click the touchscreen above the finger and that two fingers with an approximately horizontal spacing then click or touch the touchscreen with a horizontal offset from the latter above the finger, so that an instruction "replace and find next" is generated and transmitted to the application.

19. The method according to claim 5, wherein a further gesture is defined in that a diploid diagonal cross is drawn on the touchscreen or that the touchscreen is pressed with one finger, and an approximately vertical line is drawn downwards with one finger with an approximately horizontal spacing from the latter, so that an instruction "cancel" is generated and transmitted to the application.

20. The method according to claim 5, wherein a further gesture is defined in that at least three fingers are arranged apart from one another and touch the touchscreen and are then moved together, so that an instruction "close" is generated and transmitted to the application.

21. The method according to claim 5, wherein a further gesture is defined in that at least two fingers are arranged apart from one another and touch the touchscreen and a rotating movement is performed, so that an instruction "rotate" is generated and transmitted to the application.

22. The method according to claim 1, wherein a further gesture is defined in that a loop closed at the bottom which has its crossing point clearly below its ends is drawn on the touchscreen, so that an instruction "cut" is generated and transmitted to the application or that a diploid loop closed at the bottom which has its crossing point clearly below its ends is drawn on the touchscreen, so that an instruction "copy" is generated and transmitted to the application.

23. The method according to claim 1, wherein a further gesture is defined in that an approximately droplet-shaped structure is drawn on the touchscreen, so that an instruction "insert" is generated and transmitted to the application.

24. The method according to claim 1, wherein a further gesture is defined in that a wavy line or a period of a sine wave is drawn on the touchscreen, so that an instruction "process" is generated and transmitted to the application.

25. The method according to claim 1, wherein a further gesture is defined in that a tick is drawn on the touchscreen, so that an instruction "OK" is generated and transmitted to the application.

26. The method according to claim 1, wherein a further gesture is defined in that a diploid tick is drawn on the touchscreen, so that an instruction "accept" is generated and transmitted to the application.

27. The method according to claim 1, wherein:
a further gesture is defined in that a curved arrow pointing towards the right is drawn from the bottom upwards on the touchscreen, so that an instruction "undo" is generated and transmitted to the application, or
a further gesture is defined in that a curved arrow pointing towards the right is drawn from the top downwards on the touchscreen, so that an instruction "restore" is generated and transmitted to the application, or
a further gesture is defined in that a diploid curved arrow pointing towards the right is drawn from the top downwards on the touchscreen, so that an instruction "update" is generated and transmitted to the application.

28. The method according to claim 1, wherein a further gesture is defined in that a diagonal cross is drawn on the touchscreen, or that an approximately horizontal line is drawn several times on the touchscreen, so that an instruction "delete" is generated and transmitted to the application.

29. The method according to claim 1, wherein a further gesture is defined in that a cross comprising an approximately vertical line and an approximately horizontal line which intersect approximately in at least one of a middle, a half moon, and a question mark is drawn on the touchscreen, so that an instruction "help" is generated and transmitted to the application.

30. A non-transitory computer-readable medium that stores instructions for causing a processor to execute a method for operating a system with a touchscreen, a control unit for the touchscreen, a central-processing unit, and a gesture-identification unit, the method comprising:
identifying a position or a movement of one or more physical objects on or near the touchscreen by the control unit; and
associating the position or the movement of one or more physical objects with a gesture in a gesture set by a first association unit in the gesture-identification unit,
wherein a key combination or a sequence of key combinations for the gesture is transferred by a second association unit to an application, or a function for the gesture is started by the second association unit within an application, or the gesture is transferred by a second association unit to the application,
wherein graphic characters are entered through a movement of one or more physical objects on the touchscreen, and
wherein control characters followed by the graphic characters are entered through multiploid graphic characters.

31. A computer system comprising:
a touchscreen,
a control unit for the touchscreen,
a central-processing unit; and
a gesture-identification unit,
wherein the control unit identifies a position or a movement of one or more physical objects on or near the touchscreen, wherein a first association unit in the gesture-identification unit associates the position or the movement of one or more physical objects with a gesture in a gesture set, wherein a second association unit transfers a key combination or a sequence of key combinations for the gesture to the application, or a second association unit starts a function for the gesture within an application, or a second association unit transfers the gesture to an application, wherein graphic characters are entered through a movement of one or more physical objects on the touch screen, and wherein control characters followed by the graphic characters are entered through multiploid graphic characters.

32. The computer system according to claim 31, wherein gestures can be added to the gesture set by the gesture-identification unit in that the position or the movement of one or more physical objects on or near the touchscreen is identifiable by the control unit.

33. The computer system according to claim 31, wherein one or more gestures in the gesture set have a defined point which indicates at which position the gesture should act.

34. The method according to claim 4, wherein the first control character is a Ctrl- character followed by a graphic character, the second control character is an Alt- character followed by a graphic character, the third control character is an instruction character followed by a graphic character, the fourth control character is a Shift- character followed by a graphic character, and the fifth control character is a Ctrl-Alt- character followed by a graphic character.

* * * * *